(12) United States Patent
Horitake et al.

(10) Patent No.: US 9,815,376 B2
(45) Date of Patent: Nov. 14, 2017

(54) POWER SUPPLY APPARATUS

(71) Applicant: TOYOTA JIDOSHA KABUSHIKI KAISHA, Toyota-shi, Aichi-ken (JP)

(72) Inventors: Sunao Horitake, Toyota (JP); Yasuharu Terada, Toyota (JP); Hiroshi Nate, Toyota (JP); Takeaki Suzuki, Susono (JP); Michihiro Miyashita, Susono (JP); Kazuhito Eshima, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 183 days.

(21) Appl. No.: 14/962,645

(22) Filed: Dec. 8, 2015

(65) Prior Publication Data

US 2016/0185240 A1 Jun. 30, 2016

(30) Foreign Application Priority Data

Dec. 25, 2014 (JP) .................. 2014-262163

(51) Int. Cl.
*B60L 3/00* (2006.01)
*B60L 11/18* (2006.01)
(Continued)

(52) U.S. Cl.
CPC ....... *B60L 11/1809* (2013.01); *B60L 11/1851* (2013.01); *B60L 11/1861* (2013.01);
(Continued)

(58) Field of Classification Search
CPC .............. B60L 11/1809; B60L 11/1851; B60L 11/1861; B60R 16/033; B60W 10/26; H02J 7/0026; H02J 7/1423
(Continued)

(56) References Cited

U.S. PATENT DOCUMENTS 7,851,945 B2* 12/2010 Williams .................. G05F 1/66
307/18
8,010,250 B2* 8/2011 Borumand ................ H02J 1/14
700/295
(Continued)

FOREIGN PATENT DOCUMENTS

JP 2005-145097 A 6/2005
JP 2009-146843 A 7/2009
(Continued)

*Primary Examiner* — Ryan Jager
(74) *Attorney, Agent, or Firm* — Sughrue Mion, PLLC

(57) ABSTRACT

A power supply apparatus includes a first battery, a second battery, and an ECU configured to determine whether the following conditions i), ii), and iii) are satisfied: i) a degree of deterioration of the second battery is lower than a first threshold; ii) a state-of-charge of the second battery is lower than a second threshold; and iii) the state-of-charge is equal to or higher than a third threshold. The second threshold is higher by a prescribed value than a lowest allowable value of the state-of-charge at which the second battery can function as a backup power supply. The third threshold corresponds to the lowest allowable value. When determining that the conditions i), ii) and iii) are all satisfied, the ECU executes single-battery-using control in which regeneration control using the regenerative electric power is executed with use of the first battery and the second battery is not used for regeneration control.

8 Claims, 5 Drawing Sheets

(51) Int. Cl.
*B60W 10/26* (2006.01)
*H02J 7/00* (2006.01)
*H02J 7/14* (2006.01)
*B60R 16/033* (2006.01)

(52) U.S. Cl.
CPC ........... *B60R 16/033* (2013.01); *B60W 10/26* (2013.01); *H02J 7/0026* (2013.01); *H02J 7/1423* (2013.01)

(58) Field of Classification Search
USPC ........................................................ 307/10.1
See application file for complete search history.

(56) References Cited

U.S. PATENT DOCUMENTS

| | | | | |
|---|---|---|---|---|
| 8,350,510 B2* | 1/2013 | Ogasawara | ........... | H02M 3/158 180/443 |
| 8,406,936 B1* | 3/2013 | Borumand | ................ | H02J 1/14 700/286 |
| 2005/0099160 A1* | 5/2005 | Asaumi | ................ | H02J 7/0019 320/132 |

FOREIGN PATENT DOCUMENTS

| | | |
|---|---|---|
| JP | 2010-115055 A | 5/2010 |
| JP | 2011-178384 A | 9/2011 |
| JP | 2014-201234 A | 10/2014 |

* cited by examiner

POWER SUPPLY APPARATUS

INCORPORATION BY REFERENCE

The disclosure of Japanese Patent Application No. 2014-262163 filed on Dec. 25, 2014 including the specification, drawings and abstract is incorporated herein by reference in its entirety.

BACKGROUND

The embodiments described below relate to a power supply apparatus including a plurality of batteries capable of supplying electric power to a backupable auxiliary machine mounted in a vehicle.

Some power supply apparatuses may include a backup battery capable of supplying backup currents to a backupable auxiliary machine, such as a shift-by-wire, when a primary source of power is malfunctioning. For example, Japanese Patent Application Publication No. 2005-145097 (JP 2005-145097 A) describes a power supply apparatus including a first battery connected to a load device mounted in a vehicle and a second battery that functions as a backup power supply. According to JP 2005-145097 A, when it is determined that the state of charge (SOC) of the second battery is lower than that of the first battery, the battery connected to the load device is switched from the first battery to the second battery and the battery that functions as a backup power supply is switched from the second battery to the first battery.

SUMMARY

According to the technique described in JP 2005-145097 A, the second battery, which functions as a backup power supply, may be used also as a power supply for regeneration, and thus it is deemed that the fuel efficiency enhancing effect due to regeneration is increased. However, using the second battery as a power supply for regeneration accelerates deterioration of the second battery, thus causing a possibility that the second battery will soon fail to satisfy the output requirements for a backup power supply.

In order to avoid such a possibility, control of prohibiting the regeneration control may be executed, for example, when the second battery is approaching the end of its life. In this case, however, the fuel efficiency enhancing effect due to regeneration is not obtained at all. This considerably reduces the fuel efficiency.

The present embodiment provides a power supply apparatus configured to effectively enhance the fuel efficiency while maintaining the function as a backup power supply.

An aspect of the present embodiment relates to a power supply apparatus including: a backupable auxiliary machine configured to be mounted in a vehicle; a first battery; a second battery; a regeneration device; and an electronic control unit. The first battery and the second battery are configured to supply electric power to the backupable auxiliary machine. The regeneration device is configured to generate regenerative electric power to charge the first battery and the second battery. The electronic control unit is configured to determine whether the following conditions i), ii), and iii) are satisfied: i) a degree of deterioration of the second battery is lower than a first threshold; ii) a state of charge of the second battery is lower than a second threshold; and iii) the state of charge of the second battery is equal to or higher than a third threshold. The second threshold is a value that is higher by a prescribed value than a lowest allowable value of the state of charge at which the second battery is able to function as a backup power supply.

The third threshold is a value corresponding to the lowest allowable value of the state of charge of the second battery. When the electronic control determines that the conditions i), ii), and iii) are all satisfied, the electronic control unit executes "single-battery-using control." In the single-battery-using control, regeneration control using the regenerative electric power is executed with use of the first battery and the second battery is not used for the regeneration control.

In the power supply apparatus according to the above-described embodiment(s), the first battery and the second battery are configured to supply electric power to the backupable auxiliary machine such as a shift-by-wire, a brake-by-wire or a steer-by-wire. In this specification, "backupable auxiliary machine" means, among other things, a machine that needs to be supplied with electric power without fail even when a primary source of power is malfunctioning, and may also mean a machine that needs to be supplied with electric power from a power supply with high reliability (i.e., a machine that is desirably provided with a backup power supply).

The first battery is a main battery having a major function of supplying electric power to load devices (e.g. a light, a power steering apparatus, an electric stabilizer, and an electronic control unit (ECU)) mounted in the vehicle, other than the backupable auxiliary machine. On the other hand, the second battery is a sub-battery having a major function of supplying electric power to the backupable auxiliary machine. The first battery and the second battery, may be, for example, one or more of any number of various types of batteries such as lead-acid batteries, nickel-metal hydride batteries, lithium-ion batteries, and/or any other appropriate type of battery now known or hereafter discovered.

The first battery and the second battery can be charged with the regenerative electric power generated by the regeneration device. In this specification, "regenerative electric power" means, among other things, electric power generated by regenerative power generation in which kinetic energy is converted into electric energy. The regenerative power generation includes, for example, a technology of generating electric power by rotating a generator using the rotation of tires, and/or a technology of recovering the rotary power generated by an engine as electric energy. Examples of the regeneration device include an alternator, a motor generator, or any other appropriate regeneration device now known or hereafter discovered.

When the power supply apparatus according to the above-described embodiment(s) is operating, the electronic control unit determines whether the degree of deterioration of the second battery is lower than the first threshold (i.e., whether the condition i) is satisfied). In this specification, "degree of deterioration" is, among other things, a parameter indicating the degree of a decrease in the charging capacity caused by, for example, the use of the battery and the aged deterioration of the battery. In this specification, "first threshold" is, among other things, a threshold for determining whether the degree of deterioration of the second battery is low enough that the second battery satisfies the output requirements for a backup power supply. Thus, for example, when the degree of deterioration of the second battery is lower than the first threshold (i.e., when the condition i) is satisfied), it is determined that the second battery sufficiently satisfies the output requirements for a backup power supply. On the other hand, when the degree of deterioration of the second battery is equal to or higher than the first threshold (i.e., when the condition i) is not satisfied), it is determined that the second battery does not satisfy the output requirements for a backup power supply or will soon fail to satisfy the output requirements for a backup power supply.

In the above-described embodiment(s), the electronic control unit determines whether the state of charge (SOC) of the second battery is lower than the second threshold (i.e., whether the condition ii) is satisfied), in parallel with, prior to, or subsequent to making the above-described determination as to whether the degree of deterioration is lower than the first threshold (i.e., whether the condition i) is satisfied). In this specification, "second threshold" is, among other things, a threshold for determining whether the state of charge of the second battery at the time of the determination sufficiently satisfies a condition for a backup power supply. That is, the "second threshold" may be set to a value that is higher by a prescribed value than (i.e., a value that is obtained by adding a prescribed margin to) the lowest allowable value of the state of charge at which the second battery is able to function as a backup power supply. In this specification, "lowest allowable value of the state of charge at which the second battery is able to function as a backup power supply" means, among other things, the lowest value of the state of charge of the second battery that is required of the second battery in order to properly operate the backupable auxiliary machine. Note that "lowest allowable value" is set, for example, based on the electric power for driving the backupable auxiliary machine. However, "lowest allowable value" in this specification need not be a value that guarantees the backupable auxiliary machine to operate at 100%, and "lowest allowable value" may be the lowest value that is theoretically required of a backup power supply. When the determination result indicates that the state of charge of the second battery is lower than the second threshold (i.e., the condition ii) is satisfied), it is determined that the second battery cannot be used as a backup power supply, or using the second battery as a backup power supply is not appropriate (more specifically, the second battery can be used as a backup power supply, but there is a high possibility that the second battery will fail to function as a backup power supply due to the regeneration control (described later)). On the other hand, when the determination result indicates that the state of charge of the second battery is equal to or higher than the second threshold (i.e., the condition ii) is not satisfied), it is determined that there is no problem in using the second battery as a backup power supply.

Furthermore, the electronic control unit determines whether the state of charge of the second battery is equal to or higher than the third threshold (i.e., whether the condition iii) is satisfied). In this specification, "third threshold" is, among other things, a threshold for determining whether the state of charge of the second battery at the time of the determination satisfies the condition for a backup power supply, and is set to a value that corresponds to the lowest allowable value of the state of charge at which the second battery is able to function as a backup power supply. That is, the third threshold is set to a value that is lower than the second threshold. When the determination result indicates that the state of charge of the second battery is equal to or higher than the third threshold (i.e., the condition iii) is satisfied), it is determined that the second battery can be used as a backup power supply. On the other hand, when the determination result indicates that the state of charge of the second battery is lower than the third threshold (i.e., the condition iii) is not satisfied), it is determined that the second battery cannot be used as a backup power supply unless additional steps are taken.

When the results of the determination of the degree of deterioration and the determination of the state of charge indicate that the degree of deterioration of the second battery is lower than the first threshold (i.e., the condition i) is satisfied) and the state of charge of the second battery is lower than the second threshold (i.e., the condition ii) is satisfied) and equal to or higher than the third threshold (i.e., the condition iii) is satisfied), the electronic control unit executes the single-battery-using control. Specifically, the regeneration control using the regenerative electric power is executed with the use of the first battery, and the second battery is not used for the regeneration control. In this specification, "regeneration control" means, among other things, control for enhancing the fuel efficiency of the vehicle by appropriately performing charging or discharging of the regenerative electric power on at least one of the first battery and/or the second battery.

According to the above-described embodiment(s), both the first battery and the second battery can be charged with the regenerative electric power. Thus, when the first battery and the second battery are operating properly, it is possible to significantly increase the fuel efficiency enhancing effect by executing the regeneration control using both the first battery and the second battery. However, the second battery needs to maintain the function of supplying the backup electric power to the backupable auxiliary machine, and thus it may not be desirable to use the second battery for the regeneration control even when the second battery is not able to fulfill the function as a backup power supply. Thus, in some embodiments, even when the degree of deterioration of the second battery is lower than the first threshold (i.e., even when the condition i) is satisfied), if the state of charge of the second battery is lower than the second threshold (the condition ii) is satisfied) and equal to or higher than the third threshold (the condition iii) is satisfied), the regeneration control is executed using only the first battery, so that a higher priority is given to maintaining the function of the second battery as a backup power supply than to using the second battery for the regeneration control. In this way, it is possible to avoid the situation where the function of the second battery as a backup power supply is lost due to the use of the second battery for the regeneration control.

If all the regeneration controls are prohibited in order to maintain the function of the second battery as a backup power supply (i.e., when the regeneration control using the first battery is also prohibited), the fuel efficiency enhancing effect due to the regeneration control is not obtained at all. However, according to an aspect of the present embodiment, even when the regeneration control using the second battery is not executed, the regeneration control using the first battery (that is, the single-battery-using control) is executed. Thus, it is possible to obtain the fuel efficiency enhancing effect due to the regeneration control to some extent. As a result, it is possible to prevent the fuel efficiency enhancing effect due to the regeneration control from being considerably reduced.

The above-described effect can be appropriately adjusted by adjusting the magnitude of the prescribed value used in setting the second threshold. For example, when the prescribed value is set relatively large, the margin with respect to the lowest allowable value of the state of charge, at which the second battery is able to function as a backup power supply, is also relatively large. Thus, it is possible to enhance the effect of maintaining the function of the second battery as a backup power supply. On the other hand, when the prescribed value is set relatively low, the range in which the single-battery-using control is executed is relatively narrow. In other words, even when the state of charge of the second battery is relatively low, the single-battery-using control is prevented from being executed as much as possible. As a result, it is possible to increase the fuel efficiency enhancing effect due to the regeneration control.

As described above, with the power supply apparatus according to the above-described embodiment(s), it is possible to effectively enhance the fuel efficiency while maintaining the function of the second battery as a backup power supply.

In the power supply apparatus according to the above-described embodiment(s), the electronic control unit may be configured to execute the single-battery-using control when the electronic control unit determines that the condition i) is not satisfied (i.e., the degree of deterioration of the second battery is equal to or higher than the first threshold).

With this configuration, when it is determined that the degree of deterioration of the second battery is equal to or higher than the first threshold (i.e., the condition i) is not satisfied), the single-battery-using control is executed regardless of the state of charge of the second battery. In this way, when it is determined that the second battery has been deteriorated, the regeneration control using the second battery is not executed. As a result, it is possible to prevent further deterioration of the second battery and to give a higher priority to maintaining the function of the second battery as a backup power supply versus using the second battery for the regeneration control. Further, even when the regeneration control using the second battery is not executed, the regeneration control using the first battery is executed. This makes it possible to obtain the fuel efficiency enhancing effect due to the regeneration control to some extent.

In the power supply apparatus according to the above aspect, the electronic control unit may be configured to execute "two-batteries-using control" when the electronic control unit determines that the condition i) is satisfied (the degree of deterioration of the second battery is lower than the first threshold) and the condition ii) is not satisfied (the state of charge of the second battery is equal to or higher than the second threshold). The two-batteries-using control is control in which the regeneration control is executed with use of both the first battery and the second battery.

With this configuration, when there is no problem in the function of the second battery as a backup power supply, the two-batteries-using control (that is, the regeneration control using both the first battery and the second battery) is executed. Thus, it is possible to make the fuel efficiency enhancing effect higher than that when the regeneration control is executed using only one of the batteries.

In the power supply apparatus according to the above-described embodiment(s), the electronic control unit may be configured to allow charging of the second battery by the regeneration control when the electronic control unit determines that the condition iii) is not satisfied (i.e., the state of charge of the second battery is lower than the third threshold).

When the state of charge of the second battery is lower than the third threshold (i.e., when the condition iii) is not satisfied), the second battery cannot function as a backup power supply. Therefore, when the state of charge of the second battery is lower than the third threshold, it is desirable to promptly recover the state of charge of the second battery to the third threshold or higher.

With this configuration, when the state of charge of the second battery is lower than the third threshold (i.e., when the condition iii) is not satisfied), charging of the second battery by the regeneration control is allowed. More specifically, discharging of the second battery by the regeneration control is not allowed, and only charging is allowed. Thus, it is possible to appropriately recover the state of charge of the second battery, thereby more appropriately maintaining the function of the second battery as a backup power supply.

In the power supply apparatus according to the above-described embodiment(s), the first battery and the second battery may be electrically connected to each other in parallel. Further, the electronic control unit may be configured to electrically disconnect the second battery from the first battery and the regeneration device when executing the single-battery-using control.

In this configuration, the first battery and the second battery are electrically connected to each other in parallel. Thus, it is possible to stably supply electric power to the backupable auxiliary machine and other load devices, thereby maintaining a stable operation.

With this configuration, when the single-battery-using control is executed, the second battery is electrically disconnected from the first battery and the regeneration device. Thus, it is possible to reliably reduce the burden placed on the second battery due to charging and discharging, thereby effectively preventing further deterioration of the second battery. Note that, the electric disconnection of the second battery may be achieved by, for example, a switch.

In the power supply apparatus according to the above-described embodiment(s), one of the first battery and the second battery may be a lithium-ion battery or a nickel-metal hydride battery among other appropriate types of batteries.

With this configuration, it is possible to reduce, for example, the volume and mass of the first battery and/or the second battery. For example, it is possible to achieve reduction in size of the power supply apparatus. When the other one of the first battery and/or the second battery is, for example, a lead-acid battery, the first battery and the second battery are similar in open circuit voltage (OCV) characteristics. This facilitates the control of the power supply apparatus, and makes it possible to produce the power supply apparatus at a relatively low cost, which offers substantial practical advantages.

The operation and other advantageous effects of the above-described embodiment(s) will be revealed by the description described below.

BRIEF DESCRIPTION OF THE DRAWINGS

Features, advantages, and technical and industrial significance of exemplary embodiments of the technology described herein will be described below with reference to the accompanying drawings, in which like numerals denote like elements, and wherein.

DETAILED DESCRIPTION OF EMBODIMENTS

Hereinafter, a power supply apparatus will be described with reference to the accompanying drawings.

Figure 1:
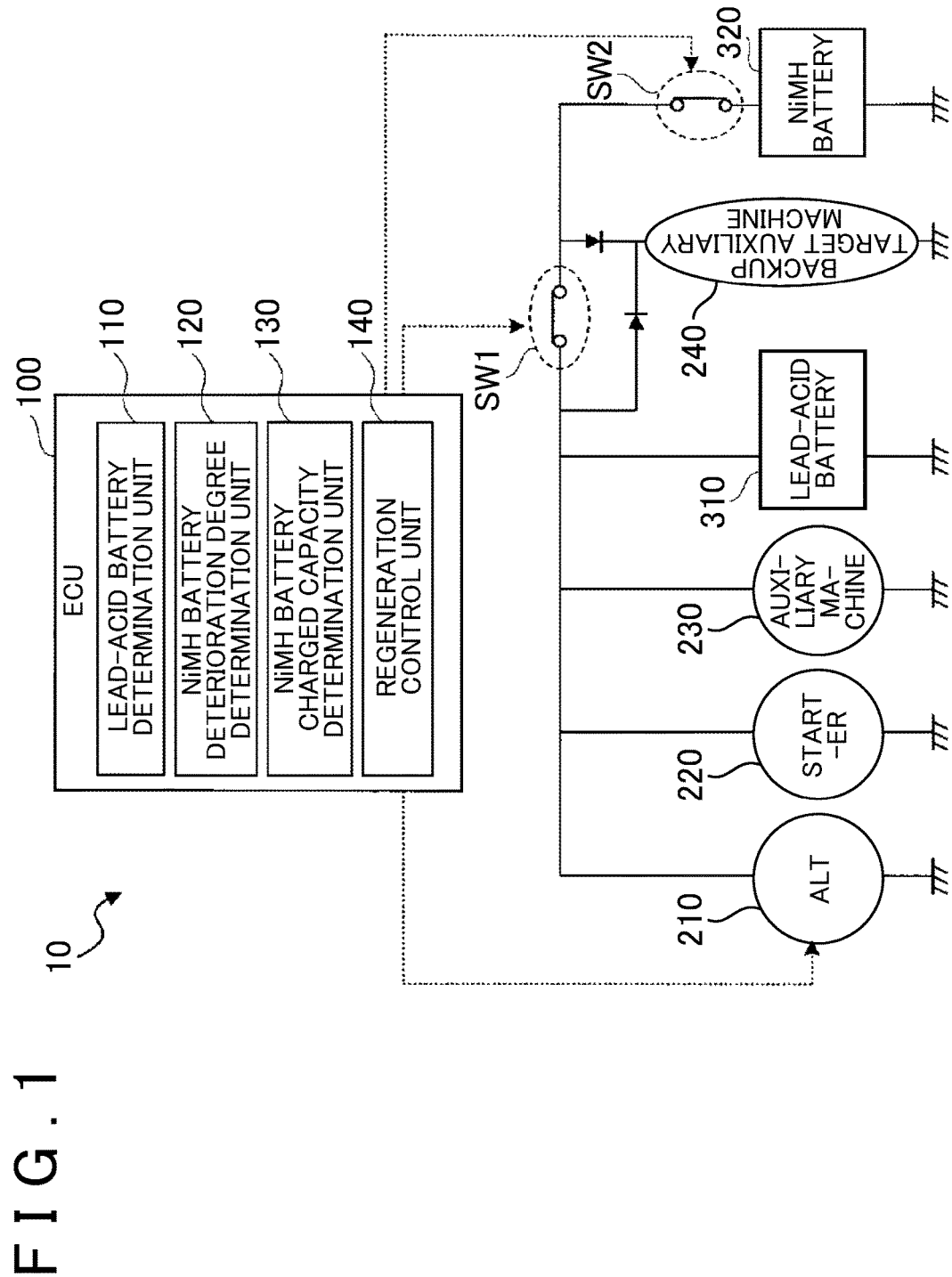
FIG. 1 is a block diagram schematically illustrating an exemplary power supply apparatus.

First, the configuration of the power supply apparatus will be described with reference to FIG. 1. FIG. 1 is a block diagram schematically illustrating the power supply apparatus. The power supply apparatus is mounted in a vehicle such as an automobile.

As illustrated in FIG. 1, a power supply apparatus 10 includes an electronic control unit (ECU) 100, an alternator 210, a starter 220, an auxiliary machine 230, a backupable auxiliary machine (backup target auxiliary machine) 240, a lead-acid battery 310, a nickel-metal hydride (NiMH) battery 320, a switch SW1, and a switch SW2.

The ECU 100 is a controller configured to control various components of the vehicle provided with the power supply apparatus 10 according to the present embodiment. The ECU 100 according to the present embodiment includes a lead-acid battery determination unit 110, a NiMH battery deterioration degree determination unit 120, a NiMH battery state-of-charge determination unit (NiMH battery charged capacity determination unit) 130, and a regeneration control unit 140.

The lead-acid battery determination unit 110 determines whether the lead-acid battery 310 is functioning properly. The NiMH battery deterioration degree determination unit 120 determines whether the degree of deterioration of the NiMH battery 320 is lower than a prescribed threshold A. The NiMH battery state-of-charge determination unit 130 determines whether the state of charge of the NiMH battery 320 is equal to or higher than a prescribed threshold B. The regeneration control unit 140 controls each of the alternator 210, the switch SW1, and the switch SW2, thereby executing control regarding regeneration control executed in the power supply apparatus 10.

The alternator 210 (an example of a "regeneration device" as described above) generates regenerative electric power from the power output from, for example, an engine (not illustrated) mounted in the vehicle. Note that a motor generator may be used as the alternator 210.

The starter 220 is a motor that operates on the electric power supplied from the lead-acid battery 310 or the NiMH battery 320. The starter 220 starts the engine mounted in the vehicle. The auxiliary machine 230 is a load device that operates on the electric power supplied from the lead-acid battery 310 or the NiMH battery 320. The auxiliary machine 230 may be, for example, a light, a power steering apparatus, or an electric stabilizer. The backupable auxiliary machine 240 is an auxiliary machine that needs to be supplied with backup electric power, for example, when a primary source of power is malfunctioning. The backupable auxiliary machine 240 may be, for example, a shift-by-wire, a brake-by-wire, or a steer-by-wire.

The lead-acid battery 310 (an example of a "first battery" as described above) is a main battery that supplies electric power mainly to the ECU 100, the starter 220, and the auxiliary machine 230. The NiMH battery 320 (an example of a "second battery" as described above) is a sub-battery (i.e., a backup battery) that supplies electric power mainly to the backupable auxiliary machine 240. Each of the lead-acid battery 310 and the NiMH battery 320 is a rechargeable battery that can be charged with the regenerative electric power generated by the alternator 210. The lead-acid battery 310 and the NiMH battery 320 are similar in open-circuit voltage (OCV) characteristics. This facilitates the control of the power supply apparatus 10, and makes it possible to produce the power supply apparatus 10 at a relatively low cost.

The switch SW1 is disposed between the backupable auxiliary machine 240 and the NiMH battery 320, and the other components. When the switch SW1 is closed (turned on), electric connection between the backupable auxiliary machine 240 and the NiMH battery 320, and the other components is established. When the switch SW1 is opened (turned off), the electric connection between the backupable auxiliary machine 240 and the NiMH battery 320, and the other components is terminated. The switch SW2 is disposed between the NiMH battery 320 and the other components. When the switch SW2 is closed (turned on), electric connection between the NiMH battery 320 and the other components is established. When the switch SW2 is opened (turned off), the electric connection between the NiMH battery 320 and the other components is terminated.

In the present embodiment, electric disconnection from, for example, the NiMH battery 320 is achieved by the switches SW1, SW2, as described above. However, the switches SW1, SW2 may be replaced with, for example, DC-DC converters. In this case as well, it is possible to execute the same control as that described below.

Figure 2:
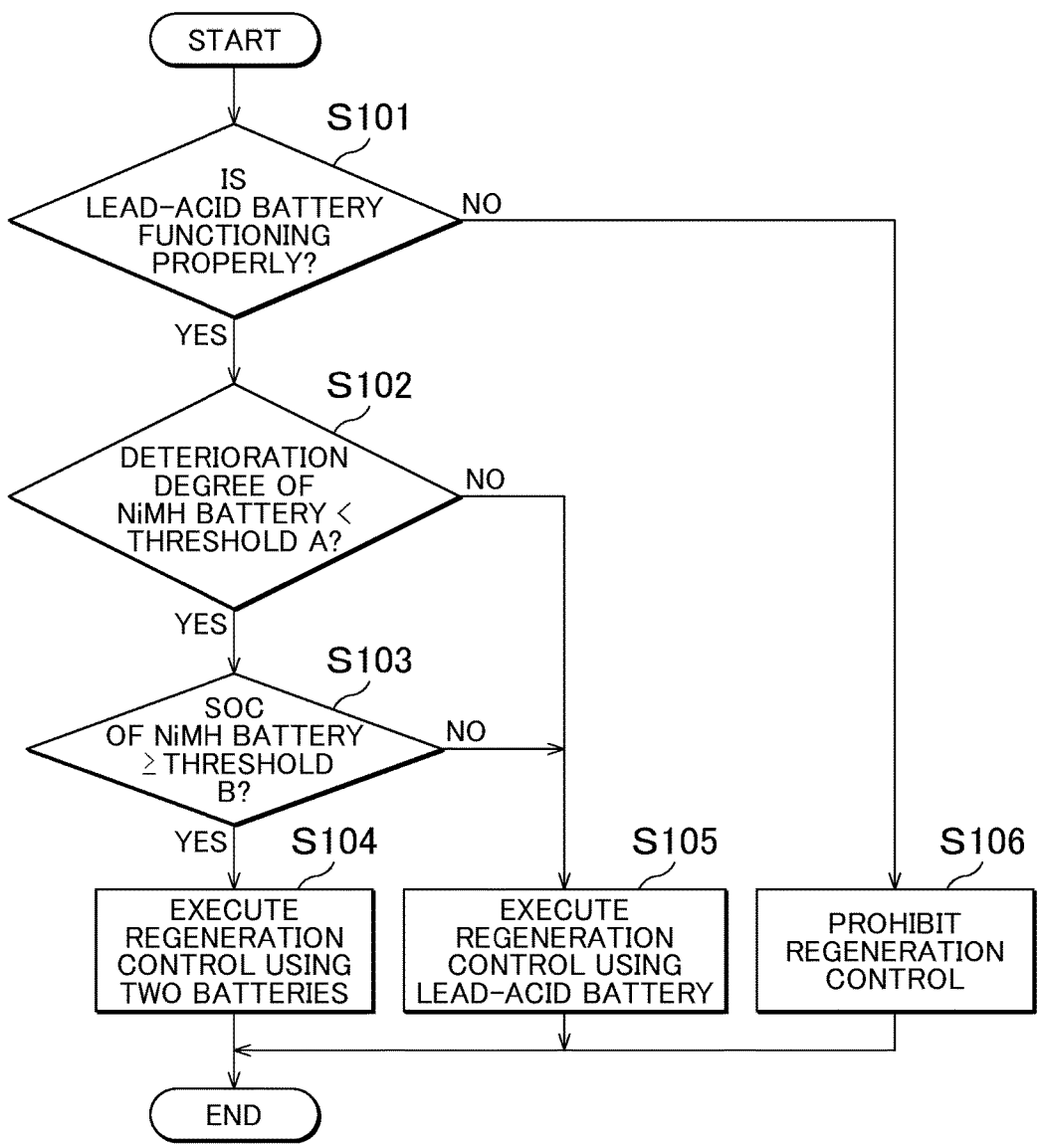
FIG. 2 is a flowchart illustrating exemplary steps of operation of the power supply apparatus of FIG. 1.

Next, regeneration control executed in the power supply apparatus 10 having the above configuration will be described with reference to FIG. 2. FIG. 2 is a flowchart illustrating the steps of an operation of the power supply apparatus 10 according to the present embodiment. Hereafter, for convenience of description, among various processes executed in the power supply apparatus 10, the process(es) related to the regeneration control will be described in detail, and descriptions of other general processes will be omitted.

As illustrated in FIG. 2, when the power supply apparatus 10 according to the present embodiment is operating, first, the lead-acid battery determination unit 110 determines whether the lead-acid battery 310 is functioning properly (step S101). That is, it is determined whether the lead-acid battery 310 is able to properly execute a required operation. The lead-acid battery determination unit 110 makes a determination based on, for example, whether the lead-acid battery 310 is operating properly without any malfunction, or whether the present maximum charging capacity and/or the present state of charge of the lead-acid battery 310 are sufficient.

When the lead-acid battery determination unit 110 determines that the lead-acid battery 310 is not functioning properly (step S101: No), the regeneration control unit 140 prohibits execution of the regeneration control (step S106). That is, neither the step of the regeneration control using the lead-acid battery 310 nor the step of the regeneration control using the NiMH battery 320 is executed. In this way, it is possible to avoid the situation where inappropriate regeneration control is executed while the lead-acid battery 310 is malfunctioning.

On the other hand, when the lead-acid battery determination unit 110 determines that the lead-acid battery 310 is functioning properly (step S101: Yes), the NiMH battery deterioration degree determination unit 120 determines whether the degree of deterioration of the NiMH battery 320 is lower than the threshold A (step S102). The threshold A (an example of a "first threshold" as described above) is set in advance as a threshold for determining whether the degree of deterioration of the NiMH battery 320 is so high that the NiMH battery 320 no longer functions as a backup power supply, or that the NiMH battery 320 will soon fail to function as a backup power supply. Through a simulation or the like, carried out in advance, the threshold A is appropriately set to a value corresponding to the maximum allowable degree of deterioration of the NiMH battery 320 due to the regeneration control. That is, the NiMH battery 320 should be prevented from deteriorating beyond the threshold A.

When the NiMH battery deterioration degree determination unit 120 determines that the degree of deterioration of the NiMH battery 320 is lower than the threshold A (step S102: Yes), the NiMH battery state-of-charge determination unit 130 determines whether the state of charge (SOC) of the NiMH battery 320 is equal to or higher than a threshold B (step S103). The threshold B (an example of a "second threshold" as described above) is set in advance as a threshold for determining whether the state of charge of the NiMH battery 320 is high enough for the NiMH battery 320 to function as a backup power supply. Through a simulation or the like carried out in advance, the threshold B is appropriately set to a value obtained by adding a prescribed margin to the lowest allowable value of the state of charge at which the NiMH battery 320 is able to function as a backup power supply.

When the NiMH battery state-of-charge determination unit 130 determines that the state of charge of the NiMH battery 320 is equal to or higher than the threshold B (step S103: Yes), the regeneration control unit 140 executes control such that regeneration control using both the lead-acid battery 310 and the NiMH battery 320 is executed (step S104). More specifically, the switches SW1, SW2 are both controlled to be closed, so that the components such as the alternator 210 and the lead-acid battery 310 are electrically connected to the backupable auxiliary machine 240 and the NiMH battery 320. In this case, it is possible to execute the regeneration control based on both the charging capacity of the lead-acid battery 310 and the charging capacity of the NiMH battery 320. Thus, the fuel efficiency enhancing effect due to the regeneration control is effectively increased. The control described above is an example of "two-batteries-using control" as described above.

On the other hand, when the NiMH battery deterioration degree determination unit 120 determines that the degree of deterioration of the NiMH battery is equal to or higher than the threshold A (step S102: No), or when the NiMH battery state-of-charge determination unit 130 determines that the state of charge of the NiMH battery 320 is lower than the threshold B (step S103: No), the regeneration control unit 140 executes control such that the regeneration control using only the lead-acid battery 310 is executed (step S105). That is, the regeneration control using the NiMH battery 320 is prohibited. More specifically, the switch SW1 is controlled to be open, so that the components such as the alternator 210 and the lead-acid battery 310 are electrically disconnected from the backupable auxiliary machine 240 and the NiMH battery 320. In this case, charging and discharging of the NiMH battery 320 due to the regeneration control are prohibited. Thus, it is possible to prevent further deterioration of the NiMH battery 320 and reduction in the state of charge of the NiMH battery 320. Therefore, a higher priority is given to maintaining the function of the NiMH battery 320 as a backup power supply than to using the NiMH battery 320 for the regeneration control. In other words, it is possible to avoid the situation where the function of the NiMH battery 320 as a backup power supply is lost due to the use of the NiMH battery 320 for the regeneration control.

The control described above is an example of "single-battery-using control" as described above.

Figure 3:
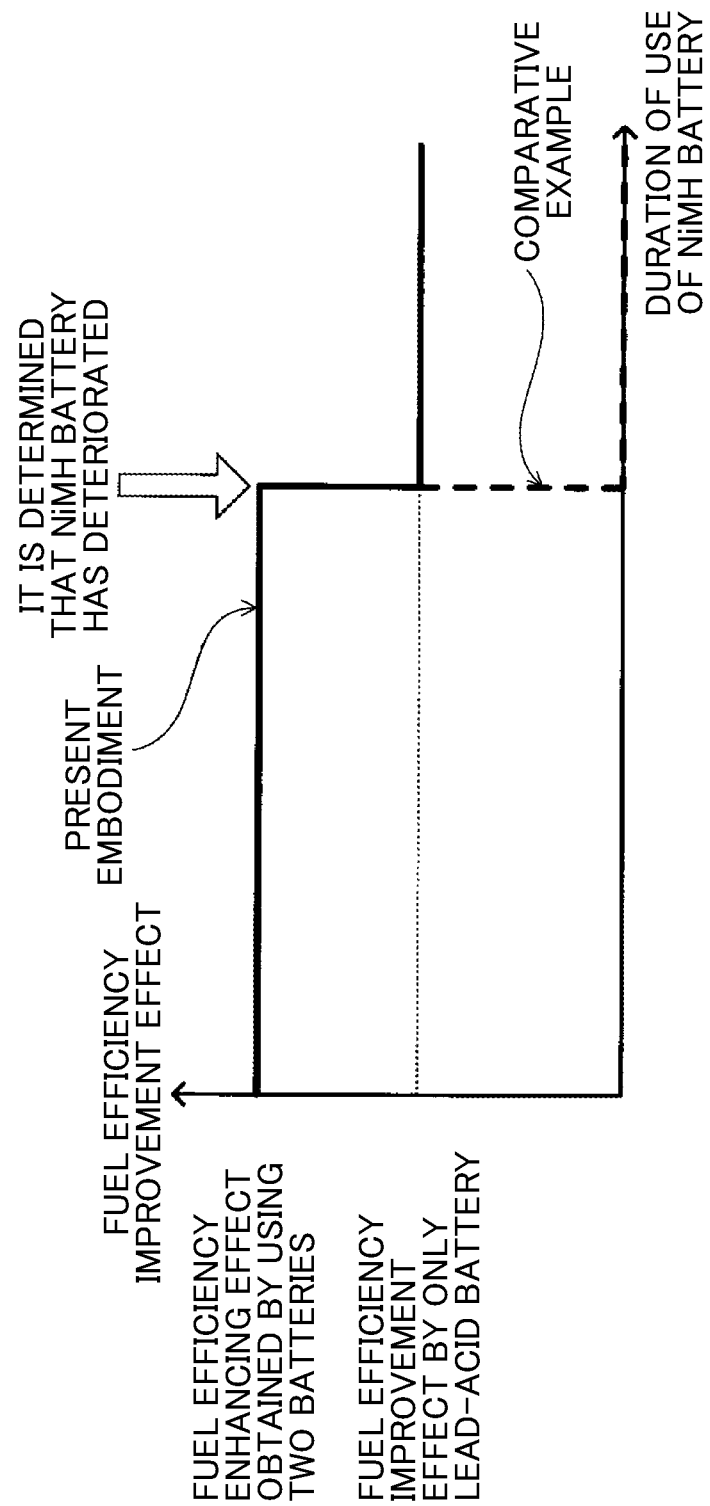
FIG. 3 is a graph illustrating the fuel efficiency enhancing effect due to regeneration control executed in the power supply apparatus of FIG. 1.

As described above, it is possible to appropriately increase the fuel efficiency enhancing effect by appropriately making switchover between the regeneration control using both the lead-acid battery 310 and the NiMH battery 320 and the regeneration control using only the lead-acid battery 310. Hereafter, the fuel efficiency enhancing effect due to the foregoing regeneration control will be described in detail with reference to FIG. 3. FIG. 3 is a graph illustrating the fuel efficiency enhancing effect due to the regeneration control executed in the power supply apparatus 10 according to the present embodiment. In FIG. 3, for convenience of description, the regeneration control using only the lead-acid battery 310, which is executed in the event of a temporary shortage of the state of charge of the NiMH battery 320 (that is, the control executed when a negative determination is made in step S103 in FIG. 2), is not taken into account.

As illustrated in FIG. 3, when the duration of use of the NiMH battery 320 is relatively short, the deterioration degree is not high, and thus it is possible to execute the regeneration control based on both the charging capacity of the lead-acid battery 310 and the charging capacity of the NiMH battery 320. Thus, when the duration of use of the NiMH battery 320 is relatively short, the fuel efficiency enhancing effect due to the regeneration control is extremely high.

However, when the duration of use of the NiMH battery 320 becomes relatively long, the deterioration degree increases to the threshold A or higher, so that it becomes necessary to give a higher priority to maintaining the function of the NiMH battery 320 as a backup power supply than to using the NiMH battery 320 for the regeneration control. For this reason, after it is determined that the NiMH battery 320 has deteriorated (that is, after the deterioration degree reaches the threshold A), the regeneration control using the NiMH battery 320 is prohibited.

Hereinafter, description will be provided on a comparative example in which all the regeneration controls are prohibited (that is, both the regeneration control using the lead-acid battery 310 and the regeneration control using the NiMH battery 320 are prohibited) after it is determined that the NiMH battery 320 has deteriorated. In such a comparative example, it is deemed that the same fuel efficiency enhancing effect as that in the present embodiment is obtained before it is determined that the NiMH battery 320 has deteriorated. On the other hand, after it is determined that the NiMH battery 320 has deteriorated, the fuel efficiency enhancing effect due to the regeneration control is not obtained at all (see a broken line in FIG. 3). As a result, after it is determined that the NiMH battery 320 has deteriorated, the fuel efficiency enhancing effect is considerably reduced.

In contrast to this, according to the present embodiment, it is possible to execute the regeneration control using the lead-acid battery 310, even after it is determined that the NiMH battery 320 has deteriorated. Thus, even after it is determined that the NiMH battery 320 has deteriorated, it is possible to obtain the fuel efficiency enhancing effect to some extent, thereby preventing an abrupt reduction in the fuel efficiency (see a solid line in FIG. 3).

Figure 4:
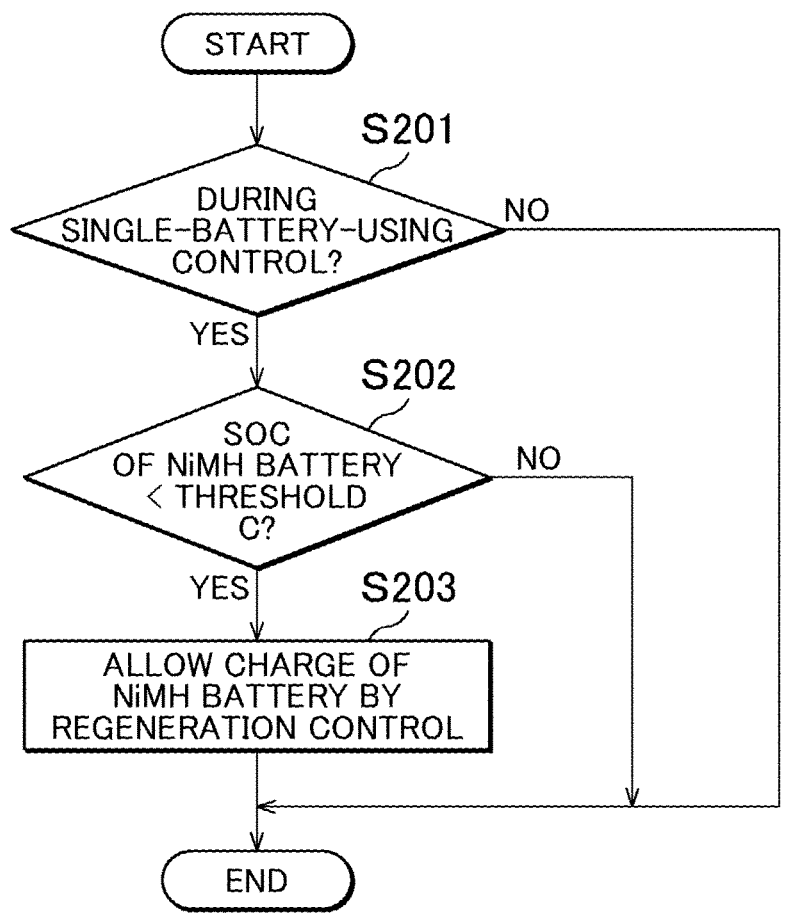
FIG. 4 is a flowchart illustrating an exemplary method of recovering the state of charge of a NiMH battery during "single-battery-using control.
Figure 5:
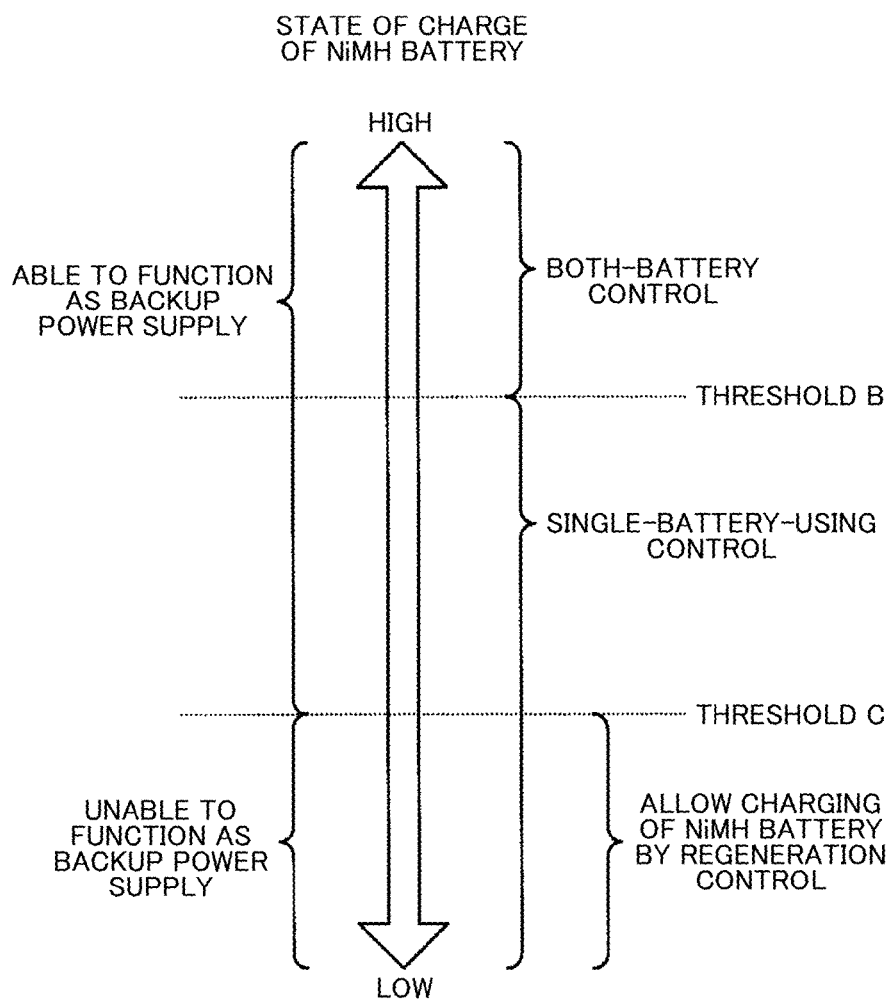
" and FIG. 5 is a conceptual diagram illustrating the controls executed selectively depending on the state of charge of the NiMH battery of FIG. 4.

Next, a method of recovering the state of charge of the NiMH battery 320 during the single-battery-using control will be described with reference to FIG. 4 and FIG. 5. FIG. 4 is a flowchart illustrating an exemplary method of recovering the state of charge of the NiMH battery 320 during the single-battery-using control. FIG. 5 is a conceptual diagram illustrating the controls executed selectively depending on the state of charge of the NiMH battery 320.

As illustrated in FIG. 4, in the power supply apparatus 10 according to the present embodiment, during the single-battery-using control (that is, when the state of charge of the NiMH battery 320 is lower than the threshold B) (step S201: YES), it is determined whether the state of charge of the NiMH battery 320 is lower than a threshold C (step S202). The threshold C (an example of a "third threshold" as described above) is a threshold that is set as the lowest allowable value of the state of charge at which the NiMH battery 320 is able to function as a backup power supply. That is, if the state of charge of the NiMH battery 320 falls below the threshold C, the NiMH battery 320 is no longer able to function as a backup power supply. Therefore, the threshold C is lower than the threshold B.

When it is determined that the state of charge of the NiMH battery 320 is lower than the threshold C (step S202: YES), the NiMH battery 320 is allowed to be charged with regenerative electric power according to the regeneration control even during the single-battery-using control (step S203). That is, although discharging of the NiMH battery 320 by the regeneration control is not allowed, charging of the NiMH battery 320 by the regeneration control is allowed.

As illustrated in FIG. 5, when the state of charge of the NiMH battery 320 is lower than the threshold C, the NiMH battery 320 is not able to function as a backup power supply. Therefore, if the state of charge of the NiMH battery 320 is lower than the threshold C, it is desirable to promptly recover the state of charge of the NiMH battery 320 to the threshold C or higher. However, when the state of charge of the NiMH battery 320 is lower than the threshold C, the state of charge of the NiMH battery 320 is also lower than the threshold B, and thus the single-battery-using control is selected. In this case, if the single-battery-using control is strictly executed (that is, if the regeneration control using the NiMH battery 320 is completely prohibited), it is necessary to charge the NiMH battery 320 by a method other than the regeneration control in order to recover the state of charge of the NiMH battery 320.

In contrast to this, according to the present embodiment, when the state of charge of the NiMH battery 320 is lower than the threshold C, charging of the NiMH battery 320 by the regeneration control is allowed even during the single-battery-using control. This makes it possible to appropriately recover the state of charge of the NiMH battery 320, thereby making it possible to more appropriately maintain the function of the NiMH battery 320 as a backup power supply. Note that when the state of charge of the NiMH battery 320 can be recovered by a method other than charging by the regeneration control, charging by the regeneration control as described above is not always required.

As described above, with the power supply apparatus 10 according to the present embodiment, it is possible to effectively enhance the fuel efficiency while maintaining the function of the NiMH battery 320 as a backup power supply.

The devices, systems, and methods described above are not limited to the foregoing embodiments, and various modifications may be made to the foregoing embodiments within the technical scope of the foregoing embodiments as would be obvious to one of ordinary skill in the art. Further, power supply apparatuses obtained by making such modifications to the foregoing embodiments are also within the technical scope of the invention.

What is claimed is:

1. A power supply apparatus comprising:
a backupable auxiliary machine configured to be mounted in a vehicle;
a first battery;
a second battery, wherein the first battery and the second battery are configured to supply electric power to the backupable auxiliary machine;
a regeneration device, wherein the regeneration device is configured to generate regenerative electric power to charge one or both of the first battery or the second battery; and
an electronic control unit, wherein the electronic control unit is configured to determine whether a first condition, a second condition, and a third condition are satisfied, wherein the first condition is satisfied when a degree of deterioration of the second battery is lower than a first threshold, wherein the second condition is satisfied when a state of charge of the second battery is lower than a second threshold, and wherein the third condition is satisfied when the state of charge of the second battery is equal to or higher than a third threshold, wherein the second threshold is higher by a prescribed value than the lowest allowable value of the state of charge at which the second battery is able to function as a backup power supply, wherein the third threshold is the lowest allowable value of the state of charge at which the second battery will function as a backup power supply, wherein the electronic control unit is further configured to execute a single-battery-using control when the electronic control unit determines that the first condition, the second condition, and the third condition are all satisfied, the single-battery-using control being control in which regeneration control using the regenerative electric power is executed with use of the first battery and the second battery is not used for the regeneration control.

2. The power supply apparatus according to claim 1, wherein the electronic control unit is configured to execute the single-battery-using control when the electronic control unit determines that the first condition is not satisfied.

3. The power supply apparatus according to claim 1, wherein the electronic control unit is configured to execute a two-batteries-using control when the electronic control unit determines that the first condition is satisfied and that the second condition is not satisfied, the two-batteries-using control being control in which the regeneration control is executed with use of both the first battery and the second battery.

4. The power supply apparatus according to claim 1, wherein the electronic control unit is configured to allow charging of the second battery by the regeneration control when the electronic control unit determines that the third condition is not satisfied.

5. The power supply apparatus according to claim 1, wherein the first battery and the second battery are electrically connected to each other in parallel, and wherein the electronic control unit is configured to electrically disconnect the second battery from the first battery and the regeneration device when executing the single-battery-using control.

6. The power supply apparatus according to claim 1, wherein at least one of the first battery or the second battery is a lithium-ion battery or a nickel-metal hydride battery.

7. A method of operation of a power supply apparatus, wherein the power supply apparatus comprises a backupable auxiliary machine configured to be mounted in a vehicle, a first battery and a second battery, wherein the first battery and the second battery are configured to supply electric power to the backupable auxiliary machine, a regeneration device, wherein the regeneration device is configured to generate regenerative electric power to charge one or both of the first battery or the second battery, the method comprising the steps of:
- determining whether a first condition is satisfied, wherein the first condition is satisfied when a degree of deterioration of the second battery is lower than a first threshold;
- determining whether a second condition is satisfied, wherein the second condition is satisfied when a state of charge of the second battery is greater than or equal to a second threshold, wherein the second threshold is higher by a prescribed value than the lowest allowable value of the state of charge at which the second battery is able to function as a backup power supply; and
- executing a single-battery-using control when it is determined that either one or both of the first condition or the second condition are not satisfied or alternatively executing a two-batteries-using control when it is determined that the first condition and the second condition are both satisfied, wherein the single-battery-using control is control in which regeneration control using the regenerative electric power is executed with use of the first battery only and the second battery is not used for the regeneration control, and wherein the two-batteries-using control is control in which regeneration control using the regenerative electric power is executed with use of both the first battery and the second battery.

8. The method of operation of claim 7, comprising the addition steps of:
- determining whether a third condition is satisfied when executing single-battery-using control, wherein the third condition is satisfied when the state of charge of the second battery is lower than a third threshold, wherein the third threshold is the lowest allowable value of the state of charge at which the second battery will function as a backup power supply; and
- charging the second battery using regenerative electric power from the regeneration device when it is determined that the third condition is satisfied.

* * * * *